2,418,837

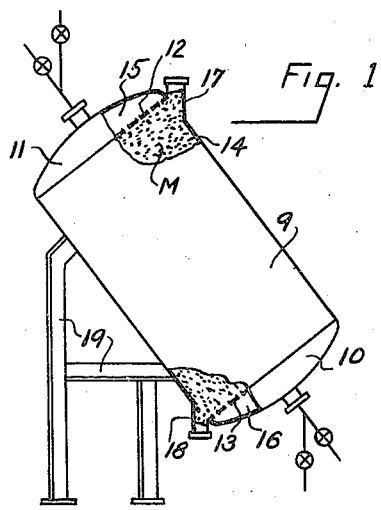
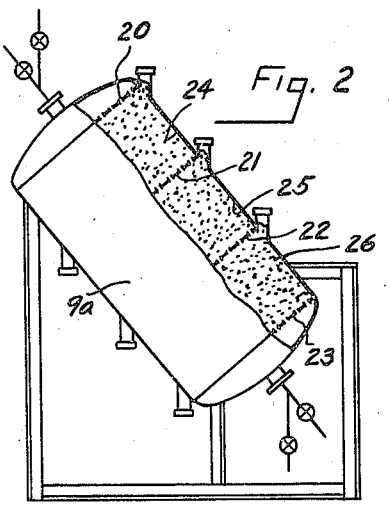
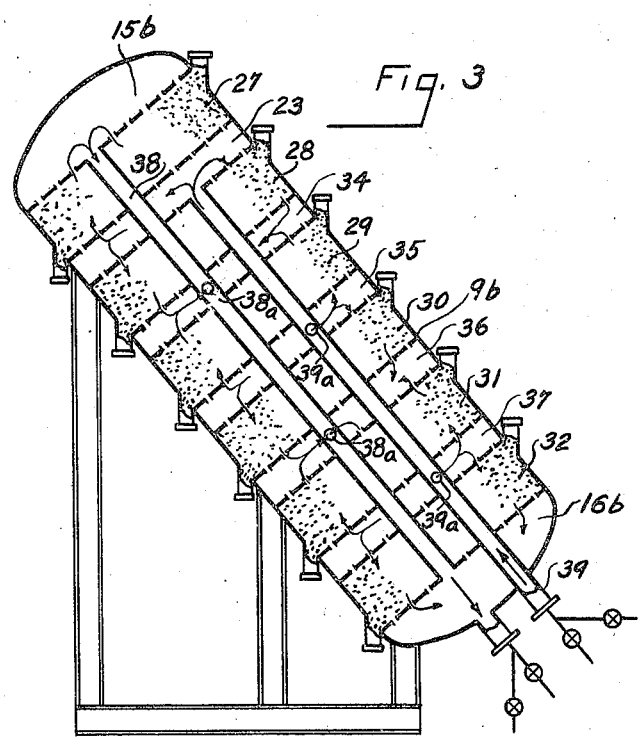

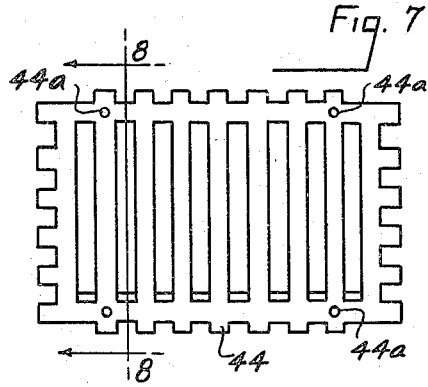
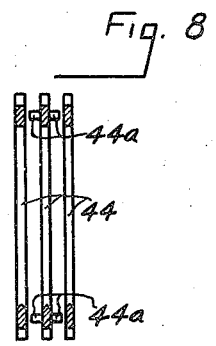
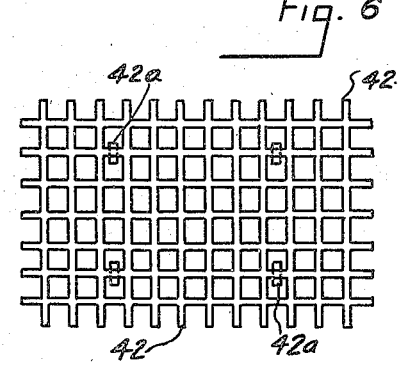
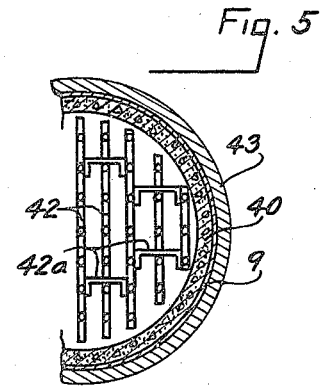
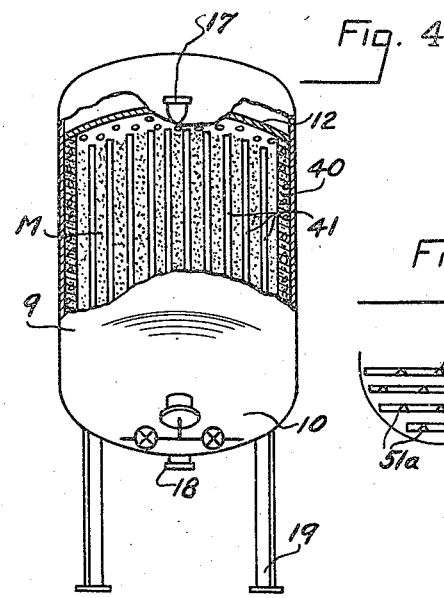
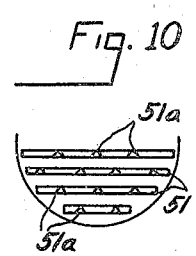
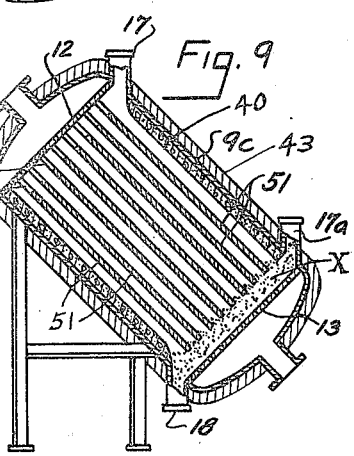
INVENTOR
EUGENE J. HOUDRY Patented Apr. 15, 1947

UNITED STATES PATENT OFFICE 2,418,837

CONTACTING APPARATUS

Eugene J. Houdry, Ardmore, Pa., assignor to Houdry Process Corporation, Wilmington, Del., a corporation of Delaware Application April 4, 1942, Serial No. 437,687

2 Claims. (Cl. 23—288)

This invention relates to contacting operations involving the use of solid contact material and more particularly to apparatus therefor. It has general applicability to a wide variety of operations ranging from mere filtering to complex organic reactions involving catalysis.

One object of the invention is to devise simple and inexpensive apparatus for contacting operations, particularly those involving catalysis. Another object is to facilitate the changing of the contact material. Still another object is to provide for storage of heat within the contacting zone or zones so that the apparatus can be operated in an adiabatic cycle. Still other objects will be apparent from the detailed description which follows.

In order to illustrate the invention and the manner of its use, concrete embodiments thereof are shown in the accompanying drawings, in which:

Fig. 1 is a side elevational view partly broken away showing one form of converter;

Fig. 2 is a side elevational view similar to Fig. 1 of a modified form of converter;

Fig. 3 is a vertical sectional view of still another form of converter;

Fig. 4 is a view from the right hand end of the converter shown in Fig. 1 with a portion of the wall of the casing removed to show heat storage members in a modified arrangement of the interior;

Fig. 5 is a fragmentary transverse sectional view of the converter shown in Fig. 4 with the catalyst removed; and another form of heat storage members;

Fig. 6 is a plan view of one of the heat storage or grid members for the central section of the converter shown in Fig. 5;

Fig. 7 is a plan view of still another form of heat storage member;

Fig. 8 is a transverse sectional view as on the line 8—8 of Fig. 7 of an assembly of several members of the type shown in Fig. 7.

Fig. 9 is a vertical sectional view of the converter of Fig. 4 but with catalytic mass omitted and showing a different arrangement of heat storage members; and Fig. 10 is a fragmentary left end view of the heat storage members of Fig. 9.

The converter disclosed in Fig. 1 comprises a cylindrical casing 9 having end closures 10 and 11 and provided on its interior with upper and lower apertured partition plates 12 and 13, respectively, extending transversely across the casing and dividing the interior of the converter into a central contact or reaction chamber 14 to be filled with contact mass M and end manifolding chambers 15 and 16, respectively. At diametrically opposite points adjacent the partition plates 12 and 13 the casing 9 is perforated and over these perforations are mounted, by welding or otherwise, a catalyst filling extension or spout 17 and a catalyst emptying extension or spout 18, these extensions having removable caps. An alternative but usually less desirable arrangement is to extend the filling spout through partition member 12 and closure 15 and the emptying spout through lower apertured partition 13 and closure 16. A framework 19 supports the converter so that its longitudinal axis is at an angle to the vertical with the catalyst filling spout 17 and the catalyst removal spout 18 at the highest and lowest points respectively of the reaction chamber 14. This arrangement permits the reaction chamber to be filled and emptied with the utmost dispatch without disturbing any portions of the converter structure other than the removal of the filling or emptying caps.

The form of the converter 9a shown in Fig. 2 is in most respects similar to that shown in Fig. 1, but differs in that it has four transverse apertured plates or partition members 20, 21, 22 and 23, so that the contacting or reaction space is divided into three chambers, namely 24, 25 and 26, each of which has a filling extension or spout and an emptying extension or spout, so that each of the chambers can be individually filled or emptied of contact material without disturbing the other chambers. Hence, chamber 24, 25 and 26 may contain identically the same contact material, different forms or activities of a single contact material, or entirely different contact materials. The reactants will pass through the converter from end to end as is the case with the converter shown in Fig. 1.

In the modification of the invention shown in Fig. 3 the casing 9b has an even greater number of perforated transverse partitions than are shown in Fig. 2, the arrangement being such as to provide contact chambers alternating with manifolding chambers. In the form shown there are six contacting or reaction chambers, namely 27, 28, 29, 30, 31 and 32, separated from one another by manifolding chambers 33, 34, 35, 36 and 37, in addition to the end manifolding chambers 15b and 16b. End manifolding chambers 15b and 16b are interconnected by a conduit 38, which passes through all of the partition members in the converter and also communicates with the manifolds 34 and 36 by openings 38a. The other manifolds, namely 33, 35 and 37, are interconnected by a conduit 39 which extends through the lower end closure member of the converter and through all of the transverse partitions, except the two uppermost ones. This conduit communicates with manifold 35 and 37 through apertures 39a in the conduit. This arrangement is advantageous when a large mass of contact material is to be utilized but the path of flow is to be restricted, as to 1 foot, 2 feet, etc., for example. The contact chambers 27, 28, 29, 30, 31 and 32 are individually provided with filling and emptying spouts as indicated so that the contact material in each of them can be changed at any time that it is deemed necessary or desirable. The outlet and inlet conduits 38 and 39 are mounted within the converter in any suitable manner to permit expansion and contraction of the various parts from temperature changes. Each conduit may be secured to one wall or partition, as by welding, and have a close sliding fit with openings in all other transverse members. If leakage around these conduits is undesirable at one or more points, fluid tight slip joints may be utilized, such for example as those illustrated in United States Patent No. 2,108,087, issued February 15, 1938, to C. H. Thayer. Another expedient to prevent leakage but to permit expansion and contraction is to secure the conduits to each partition or transverse wall and to provide expansion joints where necessary in the conduits.

Fig. 4 shows the converter of Fig. 1 in end view but discloses a different interior arrangement to adapt the converter to operate in adiabatic cycle in the conversion of hydrocarbons with "on-stream" or converting periods alternating with regenerating periods in which coky deposits resulting from the "on stream" operations are burned and the resulting heat stored in the converter to be given up during the following on-stream operation, which is endothermic. Fig. 4 illustrates an arrangement for storing heat within in the reaction chamber when the contact material itself lacks sufficient heat capacity for this purpose. As shown, the interior of chamber 14 has a lining 40 of heat resistant material, such as fireclay, fireproof cement, firebrick and the like. Within the lined reaction chamber are disposed a series of heat absorbing members in the form of imperforate metal plates 41 in rigidly spaced relation, as not over an inch apart so that the reaction space is in effect divided into a series of separate chambers with every part of the contact mass M within at least ½" of one of the members or plates. The metal plates are arranged to form a core which fits within the reaction chamber but spaced a suitable distance such as an inch or two, from both perforated partitions 12 and 13 so that the reaction spaces between the plates 41 will fill with contact material when the latter is introduced through filling spout 17 and flow out of such spaces when catalyst removal spout 18 is opened. The plates forming the core may be suitably held in spaced relation to each other by small cylindrical spacers (not shown) welded or otherwise secured to the plates so that a unitary structure is formed which is readily slipped into the reaction chamber of the converter and as readily removed therefrom. Suitable spacers or other means hold the core at the proper distance from the apertured partitions. One way to insure an accurate fit of the case is to assemble the plates into the rigid unitary structure mentioned above and then mount it in a lathe to turn it down to the proper diameter.

When less metal is required for heat absorption or when such complete division of the reaction space is undesirable, the heat storage members may take the form of the grid members 42 of Figs. 5 and 6 or of the slotted and notched metal plates 44 of Figs. 7 and 8. Fig. 6 illustrates one of the grids for the central portion of the chamber and Fig. 5 shows the arrangement in a transverse section and illustrates one manner of holding the grids in fixed relation to each other. The means for this purpose consists of U shaped strips 42a, welded or otherwise secured to one grid member, and engaging the bars of the adjacent grid members on both sides. Since adiabatic operations are conducted at rather high temperatures, as from 750° up to 1200° F., it is also desirable to avoid loss of heat by covering the exterior of casing 9 by a layer of insulating material 43 in addition to the firebrick lining 40 on the interior (Fig. 5). The metallic plates 44 of Figs. 6 and 7 are notched around their periphery for the free movement of catalyst into and out of the converter and are also extensively slotted throughout. When these slotted plates are mounted together as illustrated in Fig. 8 to fill the interior of the reaction chamber, alternating plates may be provided with spacing projections 44a as shown in Fig. 8 to hold the perforated plates in properly spaced relation.

One manner of assembling a converter utilizing heat storage members such as the grid members of Figs. 5 and 6 or the slotted plate members of Figs. 7 and 8, which have not been secured together to form a core as described in connection with Fig. 4, is as follows. The converter casing 9 first has one of the partition members, such as 12, mounted therein and if desired the corresponding end closure 15 may be attached. The casing is then placed longitudinal on a level surface and turned so that the spouts 17 and 18 are so placed that they are one-half the height of the casing. In this position the grid members 42 or slotted plates 44 are inserted and piled one upon another beginning with the narrowest of the grids. This operation will be understood if the drawing is turned 90° so that Fig. 5 is at right angles to its normal position. When the contact chamber has been filled with the grid members 41 or the perforated plates 44, the other partition member 13 is secured in place, the end closure 16 is affixed to casing 9 and the converter is ready for erection. It is then turned 90° so that the spout 17 is above and spout 18 below the grids or plate members which are vertically disposed as in Fig. 5 when in normal position. The converter is then lifted and secured to supporting frame 19 in slanted position as illustrated in Figs. 1 and 4. When the heat storage members are in the form of a unitary core the converter shell can be erected in place before the core is inserted. The reaction chamber is filled with contact material by removing the cap on filler spout 17 and pouring in contact material.

Figs. 9 and 10 illustrate a converter 9c with solid heat absorbing plates as in Fig. 4 but with the plates at 90° to the position therein shown. The plates 51 may be made up as a unitary core or may be individual, inserted and stacked in the reaction chamber as described in the preceding paragraph but with slight modification of the position of the diagonally disposed filling and emptying nozzles 17 and 18, respectively. The plates 51 terminate a short distance from lower perforated partition 13 and this space may be filled, if desired, with a different material, such as pieces of inert matter as fragments of quartz, firebrick, dead catalyst, etc., to protect the adjacent partition 13 against excessive temperature changes and to be sure that there is a body of free flowing material at the lower end of the reaction chamber. To this end another filling spout is provided at 17a through which such inert material is added after converter 9c has been erected in slanting position as shown. The inert material will flow down the upper face of partition 13 and form a layer X over the same as indicated in Fig. 9, which layer will extend only to a slight degree between plates 51 due to the fact that the ends of the plates are disposed horizontally and each is in advanced position relative to the next lower plate when the converter is erected. This arrangement is of importance in exothermic reactions when the admission of reactants is from the opposite end, which in Figure 9 is the upper end of the converter and high temperatures, such as 1100° F., and above are reached. The remainder of the reaction chamber will be filled, of course, with catalyst through nozzle 17 by the provision of suitable spacing between perforated partition 12 and the upper ends of plates 51, which plates may be provided with angular extensions 51a such as triangular or diamond shaped extensions across the space to partition 12 for temperature control of the catalytic mass therein, the extensions 51a on one plate being staggered with respect to the extensions on the next plate as shown in Fig. 10. A port at the position of 17a is of use for the insertion of a blower tube to remove any vestiges of contact material and to assist in clearing the apertures in partition plate 13 in the event that they become partially blocked or plugged.

The contact material is preferable in bits, fragments or molded pieces of proper size to flow freely through the interstices of the grid members or plates, but not so small as to clog the apertures in the partitions 12 and 13, for example 2 to 4 mm. pellets or plugs, or grains or lumps passing 4 to 8 mesh screens. The apertures in the partitions which define the reaction chambers may be suitably protected from being plugged by mounting strips of metal in slightly spaced relation thereover after the manner disclosed in U. S. Patent No. 2,276,340 issued March 17, 1942, to T. B. Prickett and C. H. Thayer. For free flow of the contact material into and out of the contacting chamber it is essential that the angle of the walls of the reaction chamber and all other surfaces on which the contact mass rests be greater than the angle of repose of the contact material. A convenient angle to the vertical for the converter is 45°, but it is obvious that this angle can be varied to some extent either up or down, depending upon the form and specific gravity of the contact material. Cylindrical converters of small and moderate diameter can be quickly and completely filled through one filling opening and be emptied at least equally as quickly through a single outlet opening as herein disclosed. When the diameter is increased in the interests of emptying and filling in very short time two or more additional pairs of diagonally disposed inlet and outlet ports may be provided in addition to the pair at the highest and lowest points of the reaction chamber. Only one pair of diagonal ports will still be sufficient, however. To effect complete filling and discharge if the shape of the converter is changed, as to square in cross section for example, it is desirable to have the converter mounted at a slant so that the diagonal of the ports is substantially vertically disposed.

If the grids of Figs. 5 and 6 are made of bars which are square or angular in cross section, it is preferable that the bars be mounted to present an angular surface upwardly rather than a flat surface (see Fig. 10) so as to minimize lodgement of contact material thereon. In the slotted plate forms of heat absorbing members the lower portions of the slots may be beveled for the same purpose, as indicated at the lower end of Fig. 8, especially when the plates are of appreciable thickness. In fact, all extensions and spacers are preferably arranged to present angular surfaces to the movement of contact material into or out of the converter.

For many catalytic operations iron oxide has an adverse catalytic effect. Hence when ferrous material is used for the grids or plates, it is desirable to protect the metal against oxidation, as during regeneration periods. One method of preventing this is to plate the ferrous material with a more resistant metal, such as chromium or chromium alloys, if the catalytic effect of the latter is not undesirable. Still another method is to make the plates or grids of alloys which are highly ressitant to corrosion, such as chrome nickel steels, for example the alloy steel designated Ka2, and the like. Still another method is to coat the metal with alumina or aluminum oxide by the so-called calorizing method, or with an enamel impervious to the reactants employed and which will not flux under the temperatures encountered during on-stream and regeneration reactions.

It will be apparent from the above that the apparatus of the present invention is capable of an extremely wide range of use for all types of contact treatment as well as for a practically unlimited range of chemical reactions involving decomposition, synthesis, metathesis, etc. The simplicity of the apparatus and the ease of changing the contact mass or masses are highly important considerations from both the commercial and operative standpoints. Moreover, the greater part of the weight of the contact mass, as well as of any heat absorbing members which may be mounted in the reaction chamber, is supported by the cylindrical or other shaped wall of the converter, thus relieving the transverse partition or partitions of the reaction chamber of such weight and permitting them to be of lighter construction. The adaptability of the apparatus to function with an adequate degree of control for reactions above 700° F. without sacrifice of simplicity is most important. The adiabatic cycle and the manner of its control and operation are discussed in detail in my copending application Ser. No. 439,358 filed April 17, 1942. The heat storage members can be mounted and utilized as desired in all of the converters herein shown. The invention covers all changes, modifications and adaptations within the scope of the appended claims.

I claim as my invention:

1. A catalytic apparatus comprising a casing, transverse apertured partitions within said casing defining with the walls of the latter a chamber, means supporting said casing at an angle to the horizontal, heat absorbing plates disposed in said chamber one above the other at the same angle to the horizontal as the casing is disposed, said heat absorbing plates being spaced from the partitions forming the chamber and being in spaced and substantially parallel relationship with each other, an inlet in a wall of the casing communicating with the uppermost portion of the space between the upper partition and the heat absorbing plates and with the space between said wall and the adjacent plate, and an outlet in the wall of the casing communicating with the lowermost portion of the last named space.

2. A catalytic apparatus comprising a casing, transverse apertured partitions within said casing defining with the walls of the latter a chamber, means supporting said casing at an angle to the horizontal, heat absorbing plates disposed in said chamber one above the other at the same angle to the horizontal as the casing is disposed, said heat absorbing plates being spaced from the partitions forming the chamber and being in spaced and substantially parallel relationship with each other, an inlet in a wall of the casing communicating with the uppermost portion of the space between the upper partition and the heat absorbing plates, an inlet in the wall of the casing communicating with the uppermost portion of the space between the lower partition and the heat absorbing plates, and an outlet in the wall of the casing communicating with the lowermost portion of the last named space.

EUGENE J. HOUDRY.

REFERENCES CITED

The following references are of record in the file of this patent:

UNITED STATES PATENTS

| Number | Name | Date |
|---|---|---|
| 2,306,011 | Burk et al. | Dec. 22, 1942 |
| 2,112,335 | Drennan | Mar. 29, 1938 |
| 2,288,943 | Eastman | July 7, 1942 |
| 1,146,363 | Statham | July 13, 1915 |
| 2,161,676 | Houdry | June 6, 1939 |
| 2,193,816 | Houdry | Mar. 19, 1940 |
| 2,312,006 | Thiele | Feb. 23, 1943 |

FOREIGN PATENTS

| Number | Country | Date |
|---|---|---|
| 383,616 | British | Feb. 14, 1930 |

OTHER REFERENCES

Ex parte Gilman, 1925 C. D. 144.
Ex parte Daiger, 1943 C. D. 5, 557 O. G. 586.
Ex parte Quayle, 1935 C. D. 11.